(No Model.) 4 Sheets—Sheet 1.
W. H. FULLER.
PHOTOGRAPHIC CAMERA.
No. 445,550. Patented Feb. 3, 1891.
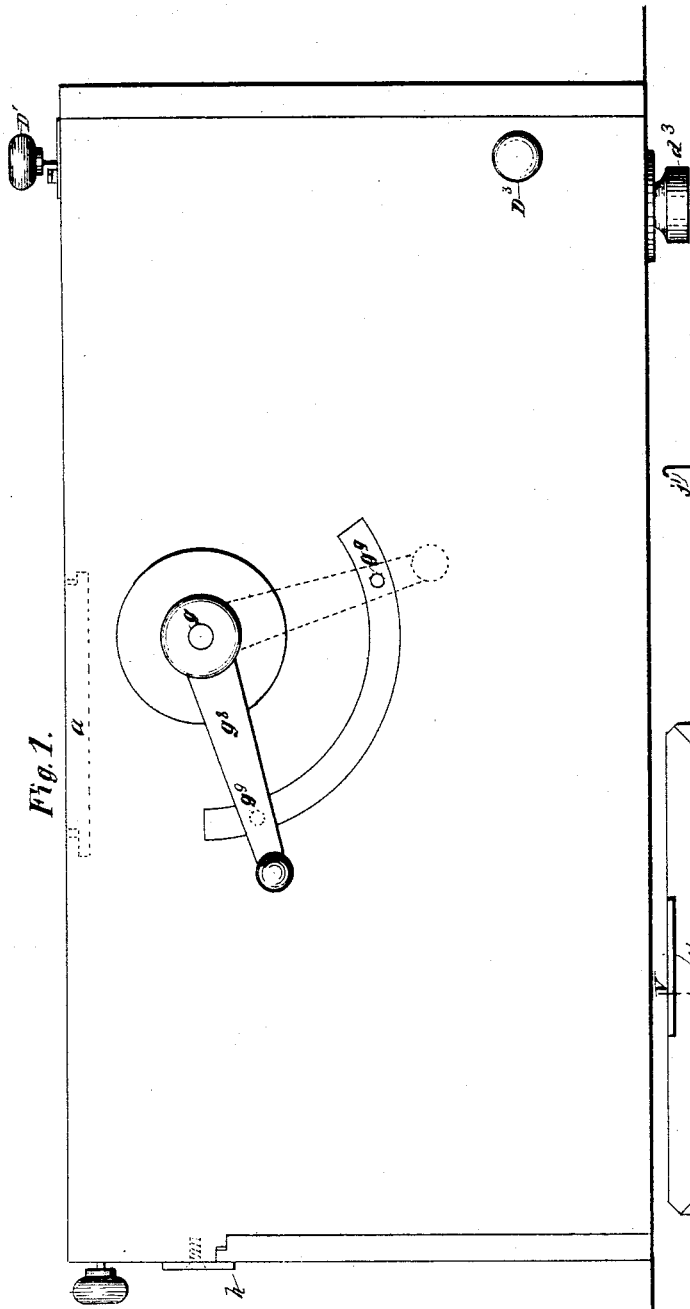
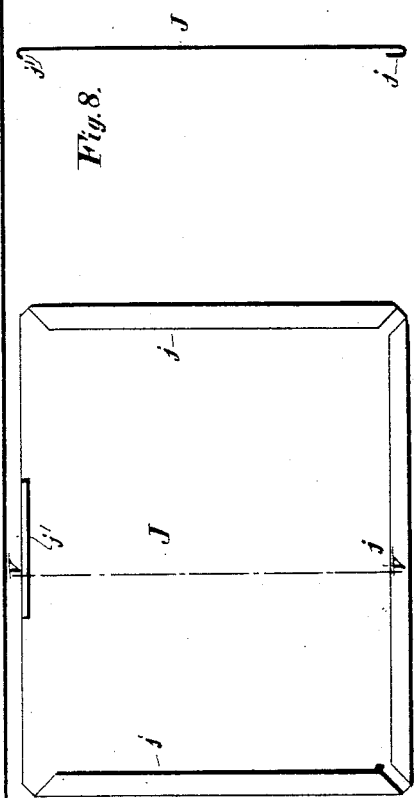
WITNESSES:
C. R. Ferguson
S. O. Edmonds
INVENTOR
Willard H. Fuller
BY Gifford H. Brown
HIS ATTORNEYS (No Model.) 4 Sheets—Sheet 2.
W. H. FULLER.
PHOTOGRAPHIC CAMERA.
No. 445,550. Patented Feb. 3, 1891.
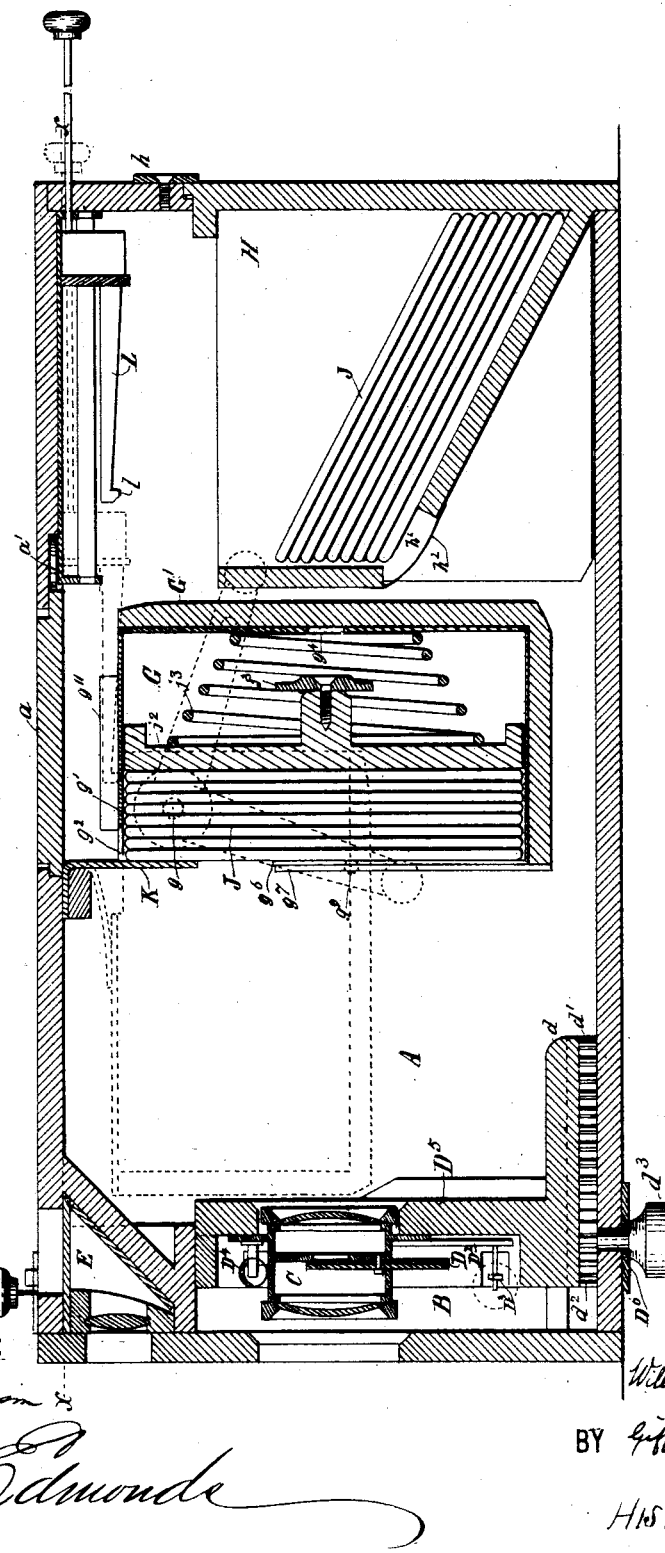

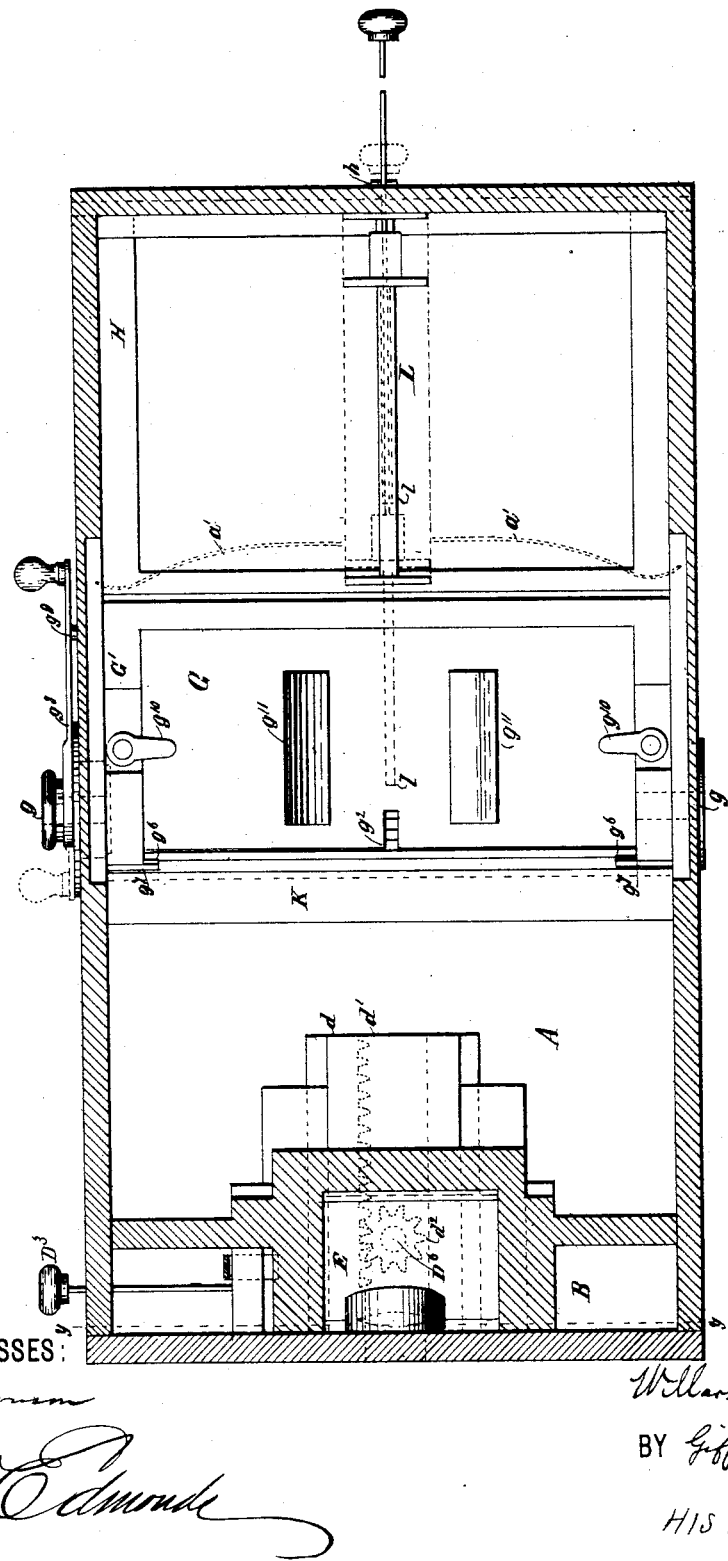

(No Model.) 4 Sheets—Sheet 4.

W. H. FULLER.
PHOTOGRAPHIC CAMERA.

No. 445,550. Patented Feb. 3, 1891.

WITNESSES:
O. R. Ferguson
S. V. Edmonds

INVENTOR
Willard H. Fuller
BY Gifford & Brown
HIS ATTORNEYS

THE NORRIS PETERS CO., PHOTO-LITHO., WASHINGTON, D. C.

UNITED STATES PATENT OFFICE.

WILLARD H. FULLER, OF PASSAIC, NEW JERSEY, ASSIGNOR TO THE SCOVILL & ADAMS COMPANY, OF NEW YORK, N. Y.

PHOTOGRAPHIC CAMERA.

SPECIFICATION forming part of Letters Patent No. 445,550, dated February 3, 1891.

Application filed July 30, 1889. Serial No. 319,181. (No model.)

*To all whom it may concern:*

Be it known that I, WILLARD H. FULLER, of Passaic, in the county of Passaic and State of New Jersey, have invented a certain new and useful Improvement in Photographic Cameras, of which the following is a specification.

I will describe a photographic camera embodying my improvement, and then point out the novel features in claims.

Figure 4:
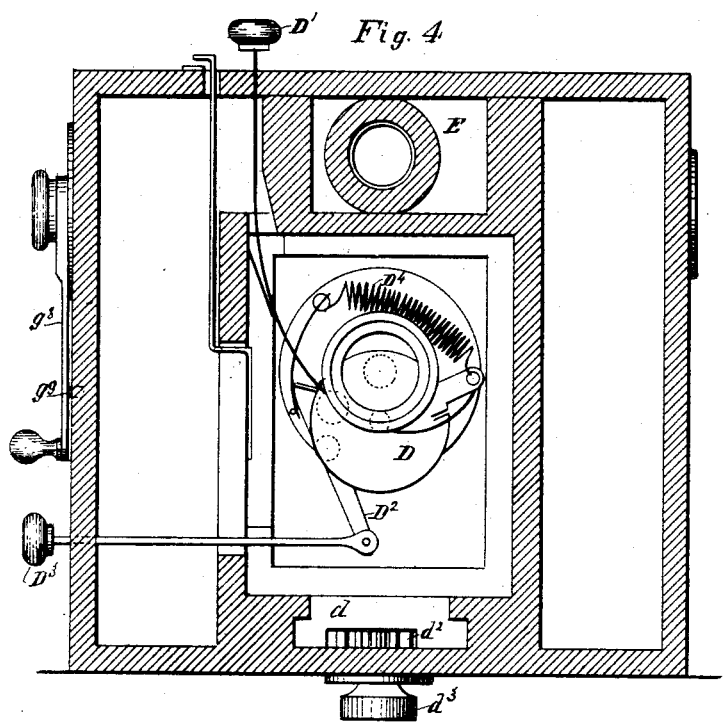
Figure 9:
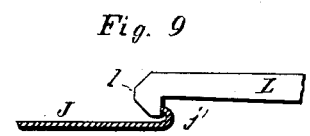
Figure 5:
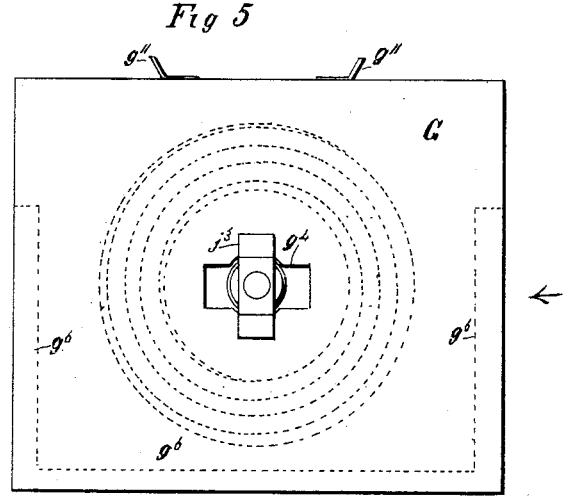
Figure 6:
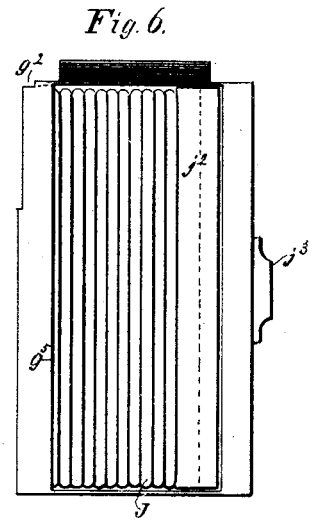

In the accompanying drawings, Figure 1 is a side view of a photographic camera embodying my improvement. Fig. 2 is a central longitudinal section of the same. Fig. 3 is a horizontal section taken at the plane of the dotted line $x\,x$, Fig. 2. Fig. 4 is a transverse vertical section taken on the plane of the dotted line $y\,y$, Fig. 3. Fig. 5 is a bottom view of a box forming part of the camera. Fig. 6 is a side view of the box illustrated in Fig. 5, the view being taken looking in the direction indicated by the arrow, which is marked adjacent to Fig. 5. Fig. 7 is a view of a plate-holder which may be used with the camera. Fig. 8 is a transverse section of this plate-holder at the plane of the dotted line $v\,v$, Fig. 7. Fig. 9 is a horizontal section of a part of a plate-holder and a part of a shifting device.

Similar letters of reference designate corresponding parts in all the figures.

A designates the main portion or dark-chamber of the camera. Forward of it is a chamber B, in which is arranged a lens-tube C, fitted with lenses of any suitable kind and having combined with it a shutter D. The shutter D may be of any desired kind and operated in any suitable manner.

As I make no claim to the shutter or its operating mechanism, I shall not further describe the same, except to say that the shutter may be set by pulling upon a hand-piece D' into a position where it will be retained by a detent $D^2$, and that the detent $D^2$ may be disengaged by a pull-piece $D^3$, whereupon a spring $D^4$ will throw the shutter.

I have shown the fore part of the camera as provided with a finder E, which may be of any suitable construction—as, for instance, a lens at the front, a mirror arranged at an angle, and a ground-glass plate extending above or at one side.

The partition $D^5$ between the dark-chamber and the chamber wherein the lens-tube C is arranged is in the present instance adjustable lengthwise of the camera. It is shown as having at the bottom a base-piece $d$, which on the under side has a longitudinal groove $d'$, provided on one upright wall with a toothed rack. With this toothed rack engages a pinion $d^2$, affixed to a shaft $D^6$, having a bearing in the bottom of the camera and a hand-piece $d^3$ on the outside. It is obvious that by rotating the hand-piece the partition $D^5$ may be moved forwardly and backwardly.

G designates a box or receptacle for containing a number of photographic plates. H designates another receptacle for photographic plates. The box or receptacle G is intended to contain plates before exposure. The receptacle H is designed to accommodate the photographic plates after they shall have been exposed. The box or receptacle G is intended to rotate or oscillate, so that it may present the plates in a vertical or in a horizontal position. In the present instance this box or receptacle G is made independent of and arranged within a case G', which has trunnions $g$, affording it a pivotal connection with the side walls of the camera-body. The case G', it will be observed, has one side and one end open. The side which is open is that one which will be toward the lens-tube when the case is adjusted, so as to present the photographic plates in a vertical position. The end of the case which is open is that one which will be the uppermost or at the top when the case presents the plates in a vertical position and will be at the rear when the case is adjusted to present the plates in a horizontal position. The box or receptacle G has that side open which will be at the front when the plates occupy a vertical position. That side $g'$ which will be at the top when the plates are in a vertical position is cut away at $g^2$, so that the foremost or outermost plate may be moved past this side.

In the present instance I have shown a number of plate-holders J, which are intended one for each plate.

I will here remark that by the term "plate" I intend to cover not only what are ordinarily termed "plates," but films and all other materials upon which photographs may be taken. The plate-holders J are shown as made of thin material, such as sheet metal of rectangular form with three edges $j$ turned over to hold the plate and with a lip $j'$ at the center of the other edge. The edges of the plate-holders having the lip $j'$ are intended to be adjacent to that side of the box or receptacle G which has the notch or cut-away portion $g^2$.

Within the box or receptacle G is a follower or false bottom $j^2$. This is moved toward the open side of the box or receptacle by means of a spring $j^3$, arranged between it and the back or opposite side of the box or receptacle G. I have shown the follower $j^2$ as having a central boss or projection to which is fitted an oscillating or rotary button $j^3$. The back or opposite side of the box or receptacle G is provided with a slot or opening $g^4$, through which the button may be passed. If the follower is pressed back until the button passes through the slot and the button is thereafter turned at right angles to the slot, the follower will be secured against any forward movement under the influence of the spring. This facilitates filling the box or receptacle. Afterward the button is turned into line with the slot to let the follower operate. The box or receptacle G is removable from the case G'. It may therefore be taken out and filled with plate-holders. There is an opening $g^5$ in one side of the box or receptacle G, in which the plate-holders may be inserted. At the front of the box or receptacle G, or, in other words, at that side which will be toward the lens-tube when the plates and plate-holders occupy a vertical position, the box or receptacle has flanges $g^6$. These flanges prevent the plates from escaping from the box or receptacle by a forward movement and render it impossible for them to escape except by edgewise movement through the cut-away portion $g^2$.

The case G' has at the edges of the open side or front flanges $g^7$ for retaining the box or receptacle G in place. The box or receptacle G may be slipped into the case G' through that end of the case G' which is at the top when the plates and plate-holders occupy a vertical position.

Swinging buttons $g^{10}$, pivoted to that end of the case G' which is at the top when the plates are in a vertical position, may be swung across the box or receptacle G after it is inserted to retain it in place. On that end of the box or receptacle G which is at the top when the plates are in a vertical position I have shown lips $g^{11}$, which serve as handles to facilitate the insertion or removal of the box or receptacle.

It will be seen that owing to the detachability of the box or receptacle G it may be taken out, filled with plates and plate-holders, where plate-holders are used, and then replaced in the case G'.

In the present instance the opening through which the box or receptacle G may be inserted is located in the top of the camera-body that is fitted with a removable cover $a$. As shown, the cover is rabbeted at opposite edges, so as to have lips which will engage with rabbets in the under side of the corresponding edges of the opening in the camera-body. One of the lips of the cover is so long that it may be slipped into its rabbet in the opening and will permit of the movement of the cover lengthwise of the camera-body sufficiently far to enable the other lip of the cover to pass through the opening. A spring $a'$, bearing upon the long lip of the cover, serves to move it in such direction that the shorter lip will enter the rabbet. Preferably in the rabbets of the cover or at the edges of the opening packings of felt or other soft material will be arranged to exclude light.

I have shown combined with the case G' a stop K for excluding light. It consists of a strip of flexible material—such, for instance, as felt—having a sufficient resilience to contact with the case while the latter is in any position.

I have shown one of the trunnions $g$ as having affixed to it outside of the case an arm $g^8$. This arm is provided with a pin $g^9$, which may be engaged with either of two holes in the adjacent side of the camera-body, or an appurtenance thereof, to secure the case G' in either of the two positions which it is intended to occupy.

L designates an adjuster for the plates or plate-holders. It is here shown as made in the form of a slide supported in bearings at the top of the camera-body and having a hand-piece extending through the camera-body, where it may be grasped. At the front end this adjuster terminates in a hook $l$. This hook is intended to engage with the lip $j'$ of the forward or outermost plate-holder J in the box or receptacle G when the latter is adjusted into such position that the plate-holders are horizontal. When the slide is moved forward, this hook will move over the lip of the outermost plate-holder. Of course there must be a yielding of one of the parts to accomplish this. The spring $j^3$ will allow of the plate-holders yielding inwardly sufficient for this purpose. After the adjuster has engaged with the outermost plate-holder it will be moved rearwardly in the camera-body, and will then serve to pull said plate-holder backward into a position where it will drop into the receptacle H. On the removal of one of the plate-holders from the box or receptacle G the follower $j^2$ will move another plate into the position of the one removed.

The receptacle H, as here shown, is fitted to slide into and out of an opening in the rear end of the camera-body in the same manner as a drawer. When in place it may be secured by one or more buttons $h$. The edges which fit the opening in the rear of the camera-body may be packed with felt or other suitable material.

I have shown the bottom of the receptacle H provided with a hole $h'$ near the higher end, and over this a strip of fabric or any flexible material $h^2$ is arranged. The finger may be pressed against the plate-holders through this opening to tilt them upwardly to facilitate their removal.

In a pending application filed February 23, 1889, Serial No. 300,895, I have inserted certain claims broad enough to cover some of the features shown and described herein.

What I claim as my invention, and desire to secure by Letters Patent, is—

1. In a photographic camera, the combination of an adjustable box or receptacle within the camera-body for photographic plates, and an adjuster for removing the plates from the said box or receptacle, substantially as specified.

2. In a photographic camera, the combination of an adjustable box or receptacle within the camera-body for photographic plates, an adjuster for removing the plates from the said box or receptacle within the camera-body, and another receptacle for receiving the plates so removed, substantially as specified.

3. In a photographic camera, the combination of a swinging or oscillating box or receptacle within the camera-body for photographic plates, and an adjuster for removing the plates from the said box or receptacle, substantially as specified.

4. In a photographic camera, the combination of a box or receptacle for plates constructed to swing from a position in which the plates will be vertical to a position in which the plates will be at an angle to the first-named position, and an adjuster for removing the plates from the said box or receptacle, the arrangement of the box or receptacle and adjuster being such that when the box or receptacle is in its normal position the plates cannot be reached by the adjuster and that when the box or receptacle is moved into its other position the plates can be reached by the adjuster, substantially as specified.

5. In a photographic camera, the combination of a box or receptacle for plates constructed to swing from a position in which the plates will be vertical to a position in which the plates will be at an angle to the first-named position, and a reciprocating adjuster for removing the plates from the said box or receptacle, the arrangement of the box or receptacle and adjuster being such that when the box or receptacle is in its normal position the plates cannot be reached by the adjuster and that when the box or receptacle is moved into its other position the plates can be reached by the adjuster, substantially as specified.

6. In a photographic camera, the combination of a box or receptacle for plates, a case with which said box or receptacle is removably connected, which case is adjustably supported in the body of the camera, and an adjuster for removing the plates from the said box or receptacle, substantially as specified.

7. In a photographic camera, the combination of a swinging box or receptacle for plates, having one side open and an adjacent side cut away and fitted with a spring-actuated follower, substantially as specified.

8. In a photographic camera, the combination of a swinging box or receptacle for plates, having one side open, an adjacent side cut away, flanges at certain of the sides, and a follower, substantially as specified.

9. In a photographic camera, the combination of a box or receptacle for plates, having one side open, a follower fitted opposite the said open side, and a catch on the follower constructed to engage with the back of the box or receptacle, substantially as specified.

10. In a photographic camera, the combination of a box or receptacle for plates and a case for receiving the same, the latter being arranged within the common body and having one open side and end and provided with flanges, substantially as specified.

11. In a photographic camera, the combination of a box or receptacle for plates and a case for receiving the same, the latter having one open side and end and provided with flanges and catches, substantially as specified.

12. In a photographic camera, the combination of a receptacle for plates swinging on trunnions, an arm outside the body of the camera, operating in conjunction with one of the trunnions, and a follower within the receptacle, substantially as specified.

13. In a photographic camera, the combination of a plate-receptacle made in the form of a slide and swinging on trunnions, and an arm outside the body of the camera, operating in conjunction with one of the trunnions, substantially as specified.

14. In a photographic camera, the combination of a box or receptacle for photographic plates, an adjuster supported independently of the box or receptacle for removing the plates from said box or receptacle, and another receptacle for receiving the plates so removed, substantially as specified.

15. In a photographic camera, the combination of a box or receptacle for plates movable from a position in which the plates will be vertical to a position in which the plates will be at an angle to the first-named position, and an adjuster for removing the plates from the said box or receptacle, the arrangement of the box or receptacle and adjuster being such that when the box or receptacle is in its vertical position the plates cannot be reached by the adjuster, and when the box or receptacle is turned into its other position the plates can be reached by the adjuster, substantially as specified.

16. In a photographic camera, the combination of a box or receptacle for plates movable from a position in which the plates will be exposed to a lens to a horizontal position, and an adjuster for removing the plates from the box or receptacle when in its last-named position, substantially as specified.

WILLARD H. FULLER.

Witnesses:
H. CLAY PRICE,
H. LITTLEJOHN.

It is hereby certified that in Letters Patent No. 445,550, granted February 3, 1891, upon the application of Willard H. Fuller, of Passaic, New Jersey, for an improvement in "Photographic Cameras," an error appears in the printed specification requiring the following correction, viz.: In line 95, page 3, the word "common" should read *camera;* and that the Letters Patent should be read with this correction therein to make it conform to the record of the case in the Patent Office.

Signed, countersigned, and sealed this 17th day of March, A. D. 1891.

[SEAL.]

CYRUS BUSSEY,
*Assistant Secretary of the Interior.*

Countersigned:
    C. E. MITCHELL,
        *Commissioner of Patents.*